United States Patent
Wang et al.

(10) Patent No.: US 10,627,663 B2
(45) Date of Patent: Apr. 21, 2020

(54) LIQUID CRYSTAL GRATING, DISPLAY DEVICE AND METHODS FOR CONTROLLING THEREOF

(71) Applicant: BOE TECHNOLOGY GROUP CO., LTD., Beijing (CN)

(72) Inventors: Qian Wang, Beijing (CN); Xiaochuan Chen, Beijing (CN); Wenqing Zhao, Beijing (CN); Wei Wang, Beijing (CN); Jian Gao, Beijing (CN); Xianqin Meng, Beijing (CN); Zhongxiao Li, Beijing (CN); Chenyu Chen, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/765,635

(22) PCT Filed: Sep. 22, 2017

(86) PCT No.: PCT/CN2017/102909
§ 371 (c)(1),
(2) Date: Apr. 3, 2018

(87) PCT Pub. No.: WO2018/171142
PCT Pub. Date: Sep. 27, 2018

(65) Prior Publication Data
US 2019/0018278 A1    Jan. 17, 2019

(30) Foreign Application Priority Data

Mar. 20, 2017 (CN) .......................... 2017 1 0165167

(51) Int. Cl.
*G02B 5/18* (2006.01)
*G02F 1/1335* (2006.01)
(Continued)

(52) U.S. Cl.
CPC ..... *G02F 1/133504* (2013.01); *G02B 5/1871* (2013.01); *G02F 1/1323* (2013.01);
(Continued)

(58) Field of Classification Search
CPC ............. G02F 1/133753; G02F 1/1323; G02F 1/133504; G02F 2001/13756; G02B 5/1871
See application file for complete search history.

(56) References Cited

U.S. PATENT DOCUMENTS 6,388,730 B1 * 5/2002 Lindquist .......... G02F 1/134363
349/200
2010/0149444 A1 6/2010 Hikmet et al.
(Continued)

FOREIGN PATENT DOCUMENTS

| CN | 1391662 A | 1/2003 |
|---|---|---|
| CN | 101675379 A | 3/2010 |

(Continued)

OTHER PUBLICATIONS

International Search Report from PCT Application No. PCT/CN2017/102909 dated Jan. 4, 2018 (6 pages).
(Continued)

*Primary Examiner* — Paisley L Wilson
*Assistant Examiner* — Mariam Qureshi
(74) *Attorney, Agent, or Firm* — Dave Law Group LLC; Raj S. Dave

(57) ABSTRACT

The embodiments of the present disclosure relate to a liquid crystal grating, a display device, and methods for controlling thereof. The liquid crystal grating comprises a first substrate; a second substrate disposed opposite to the first substrate; an electrode layer disposed on the first substrate or the second substrate, wherein the electrode layer comprises at least two sets of electrodes arranged periodically, and each set of
(Continued)

electrodes of the two sets of electrodes comprises two sub-electrodes arranged parallel to each other; a liquid crystal layer disposed between the first substrate and the second substrate; and a control unit configured to make the liquid crystal grating be operated in a transparent mode or a grating mode; when the liquid crystal grating is operated in the transparent mode, there is no voltage difference between two sub-electrodes of each set of electrodes, and between two adjacent sub-electrodes of different sets; and when the liquid crystal grating is operated in the grating mode, there is a voltage difference between two sub-electrodes of each set of electrodes, and there is no voltage difference between two adjacent sub-electrodes of different sets. The embodiments of the present disclosure can increase the viewing angle of display device, and cancel the zero-order diffraction of light of different wavelengths.

11 Claims, 9 Drawing Sheets

(51) Int. Cl.
    *G02F 1/1343*     (2006.01)
    *G09G 3/36*     (2006.01)
    *G02F 1/1337*     (2006.01)
    *G02F 1/13*     (2006.01)

(52) U.S. Cl.
    CPC ...... *G02F 1/1343* (2013.01); *G02F 1/133753* (2013.01); *G02F 1/134309* (2013.01); *G09G 3/36* (2013.01); *G02F 2201/30* (2013.01)

(56) References Cited

U.S. PATENT DOCUMENTS

| | | | |
|---|---|---|---|
| 2010/0302499 A1 | 12/2010 | Watanabe | |
| 2012/0105750 A1 | 5/2012 | Yoon et al. | |
| 2013/0201228 A1* | 8/2013 | Krijn | G02B 27/2214 345/698 |
| 2014/0063383 A1* | 3/2014 | Xie | G02B 27/2228 349/15 |
| 2016/0033698 A1 | 2/2016 | Escuti et al. | |

FOREIGN PATENT DOCUMENTS

| | | |
|---|---|---|
| CN | 102231020 A | 11/2011 |
| CN | 102893615 A | 1/2013 |
| CN | 103278958 A | 9/2013 |
| CN | 104035229 A | 9/2014 |
| CN | 105447420 A | 3/2016 |
| CN | 106019649 A | 10/2016 |
| CN | 106125361 A | 11/2016 |
| CN | 106324897 A | 1/2017 |
| CN | 106575007 A | 4/2017 |
| CN | 106707578 A | 5/2017 |
| JP | 2009192558 A | 8/2009 |
| WO | WO-2014037036 A1 | 3/2014 |

OTHER PUBLICATIONS

Written Opinion from PCT Application No. PCT/CN2017/102909 dated Jan. 4, 2018 (6 pages).

* cited by examiner

LIQUID CRYSTAL GRATING, DISPLAY DEVICE AND METHODS FOR CONTROLLING THEREOF

This application claims the benefit and priority of Chinese patent application No. 201710165167.7 filed on Mar. 20, 2017. The entire disclosure of the above application is incorporated herein by reference as a part of this application.

TECHNICAL FIELD

The present disclosure relates to the field of display techniques, and particularly, to a liquid crystal grating, a display device and methods for controlling thereof.

BACKGROUND

Nowadays, types of electronic devices are becoming more and more, such as desktop computers, laptops, cell phones, e-book readers, etc. However, while providing people with many conveniences, the electronic devices may also cause personal information to be leaked. For example, users often use the above electronic devices in public places, and display screens of electronic devices generally have a relatively large visual angle, which is disadvantageous for the security of personal information.

SUMMARY

The embodiments of the present disclosure provide a liquid crystal grating, a display device and methods for controlling thereof.

In a first aspect of the present disclosure, a liquid crystal grating is provided, comprising: a first substrate; a second substrate disposed opposite to the first substrate; an electrode layer disposed on the first substrate or the second substrate, wherein the electrode layer comprises at least two sets of electrodes arranged periodically, and each set of electrodes of the two sets of electrodes comprises two sub-electrodes arranged parallel to each other; a liquid crystal layer disposed between the first substrate and the second substrate; and a control unit configured to make the liquid crystal grating be operated in a transparent mode or a grating mode; when the liquid crystal grating is operated in the transparent mode, there is no voltage difference between two sub-electrodes of each set of electrodes, and between two adjacent sub-electrodes of different sets; and when the liquid crystal grating is operated in the grating mode, there is a voltage difference between two sub-electrodes of each set of electrodes, and there is no voltage difference between two adjacent sub-electrodes of different sets.

In one embodiment, when the liquid crystal grating is operated in the grating mode, the voltage difference between the two sub-electrodes of each set of electrodes is the same.

In one embodiment, when the liquid crystal grating is operated in the grating mode, the voltage difference between the two sub-electrodes of each set of electrodes varies at a predetermined frequency.

In one embodiment, when the liquid crystal grating is operated in the grating mode, the voltage difference between the two sub-electrodes of each set of electrodes makes an extension range of an area, where liquid crystal molecules in the liquid crystal layer are rotated, in a direction perpendicular to the first substrate or the second substrate be equal to a wavelength of incident light.

In a second aspect of the present disclosure, a display device is provided, comprising a display module and any liquid crystal grating described in the first aspect of the present disclosure.

In one embodiment, the display module is a liquid crystal display module, and the liquid crystal grating is located above an upper polarizer of the liquid crystal display module or between a lower polarizer and a backlight module thereof.

In a third aspect of the present disclosure, there is provided a method for controlling any liquid crystal grating described in the first aspect of the present disclosure, wherein the control unit makes the liquid crystal grating be operated in a transparent mode or a grating mode; when the liquid crystal grating is operated in the transparent mode, there is no voltage difference between two sub-electrodes of each set of electrodes, and between two adjacent sub-electrodes of different sets; and when the liquid crystal grating is operated in the grating mode, there is a voltage difference between two sub-electrodes of each set of electrodes, and there is no voltage difference between two adjacent sub-electrodes of different sets.

In one embodiment, when the liquid crystal grating is operated in the grating mode, the voltage difference between the two sub-electrodes of each set of electrodes is the same.

In one embodiment, when the liquid crystal grating is operated in the grating mode, the voltage difference between the two sub-electrodes of each set of electrodes varies at a predetermined frequency.

In one embodiment, when the liquid crystal grating is operated in the grating mode, the voltage difference between the two sub-electrodes of each set of electrodes makes an extension range of an area, where liquid crystal molecules in the liquid crystal layer are rotated, in a direction perpendicular to the first substrate or the second substrate be equal to a wavelength of incident light.

In a fourth aspect of the present disclosure, there is provided a method for controlling any display device described in the second aspect of the present disclosure, wherein the control unit makes the liquid crystal grating be operated in a transparent mode or a grating mode; when the liquid crystal grating is operated in the transparent mode, there is no voltage difference between two sub-electrodes of each set of electrodes, and between two adjacent sub-electrodes of different sets; and when the liquid crystal grating is operated in the grating mode, there is a voltage difference between two sub-electrodes of each set of electrodes, and there is no voltage difference between two adjacent sub-electrodes of different sets.

In one embodiment, when the liquid crystal grating is operated in the grating mode, the voltage difference between the two sub-electrodes of each set of electrodes is the same.

In one embodiment, when the liquid crystal grating is operated in the grating mode, the voltage difference between the two sub-electrodes of each set of electrodes varies at a predetermined frequency.

In one embodiment, when the liquid crystal grating is operated in the grating mode, the voltage difference between the two sub-electrodes of each set of electrodes makes an extension range of an area, where liquid crystal molecules in the liquid crystal layer are rotated, in a direction perpendicular to the first substrate or the second substrate be equal to a wavelength of incident light.

In one embodiment, the predetermined frequency is more than three times of a refresh frequency of the display device.

Further aspects and scopes of applicability will become apparent from the description provided herein. It should be understood that various aspects of this application may be implemented individually or in combination with one or more other aspects. It should also be understood that the description and specific examples herein are intended merely for the purpose of illustration, rather than limiting the scope of this application.

BRIEF DESCRIPTION OF DRAWINGS

The drawings described herein are for illustrative purpose only of selected embodiments rather than any possible implementation, and they are not intended to limit the scope of this application, in which.

DETAILED DESCRIPTION

Figure 1:
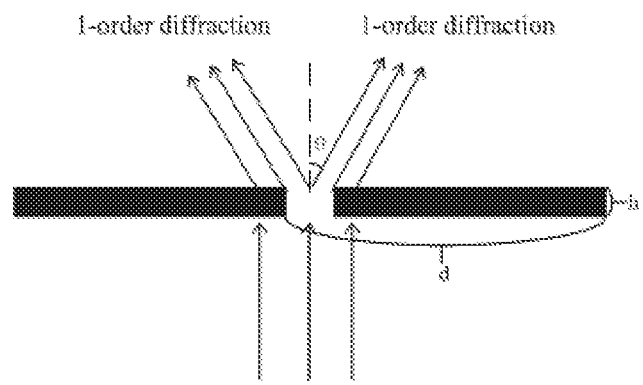
FIG. 1 schematically illustrates a diffraction pattern of light.

Firstly, it should be noted that unless additionally and explicitly pointed out in the context, the singular form of the words used herein and in the appended claims includes the plural form, and vice versa. Thus, when a word is mentioned in the singular form, it usually includes the plural form. Similarly, the words "include" and "comprise" will be interpreted as inclusive rather than exclusive. Likewise, the terms "comprise" and "or" should be interpreted as inclusive unless the interpretation is explicitly prohibited herein. Where the term "example" is used herein, and particularly following a group of terms, it is merely exemplary and illustrative and should not be considered as exclusive or extensive.

In addition, in the drawings, the thickness and area of each layer are exaggerated for clarity. It should be understood that the orientation or position relationship indicated by the terms "longitudinal", "radial", "upper", "lower", "front", "rear", "left", "right", "vertical", "horizontal", "top", "bottom", "in", "out" and the like are those illustrated based on the orientation or position relationship shown in the drawings. They are just used to facilitate and simplify the description of the embodiments of the present disclosure, rather than indicating or implying that any mentioned component must have a particular orientation, or be constructed or operated in a particular orientation, and hence cannot be understood as limitations to the present disclosure. The terms "first", "second", "third" and the like are just used for description, and should not be understood as indicating or implying any relative importance or formation order.

In the description of the present disclosure, the orientations or position relationship indicated by the terms "on", "above", "under", "below", "between", etc. are those illustrated based on the orientation or position relationship shown in the drawings. They are just used to facilitate and simplify the description of the present disclosure, rather than indicating or implying that any mentioned device or element must have a particular orientation, or be constructed or operated in a particular orientation, and hence cannot be understood as limitations to the present disclosure. In addition, when an element or layer is referred to as being "on" another element or layer, it may be directly located on the another element or layer, or there may be an intermediate element or layer; similarly, when an element or layer is referred to as being "under" another element or layer, it may be directly located under the another element or layer, or there may be at least one intermediate element or layer; and when an element or layer is referred to as being "between" two elements or layers, it may be an only element or layer between the two elements or layers, or there may be more than one intermediate element or layer.

It should be noted that the following drawings and examples are not intended to limit the scope of the present disclosure. In the case where specific elements of the embodiments of the present disclosure may be partially or entirely implemented using known components (or methods or processes), only portions of the known components (or methods or processes) necessary to understand the embodiments of the present disclosure will be described, and detailed description of other portions of the known components will be omitted so as not to confuse the present disclosure. Further, various embodiments include equivalents known at present and in the future, which are equivalent to the components concerned herein, by means of illustration.

Based on the privacy requirement, a anti-peeping film is usually used on the mobile display device. However, the current anti-peeping films are all fixed and cannot be switched to sharing mode. It has to remove the anti-peeping film when the viewing angle needs to be expanded, resulting in inconvenient uses.

The exemplary embodiments will now be described more fully with reference to the drawings.

Figure 2A:
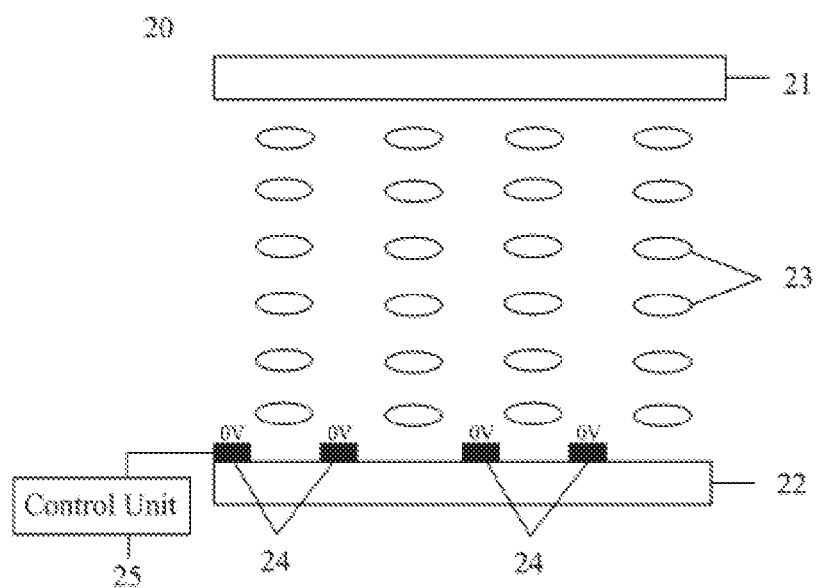
FIGS. 2A, 2B and 2C schematically illustrate cross-sectional views of an exemplary liquid crystal grating according to an embodiment of the present disclosure.
Figure 2B:
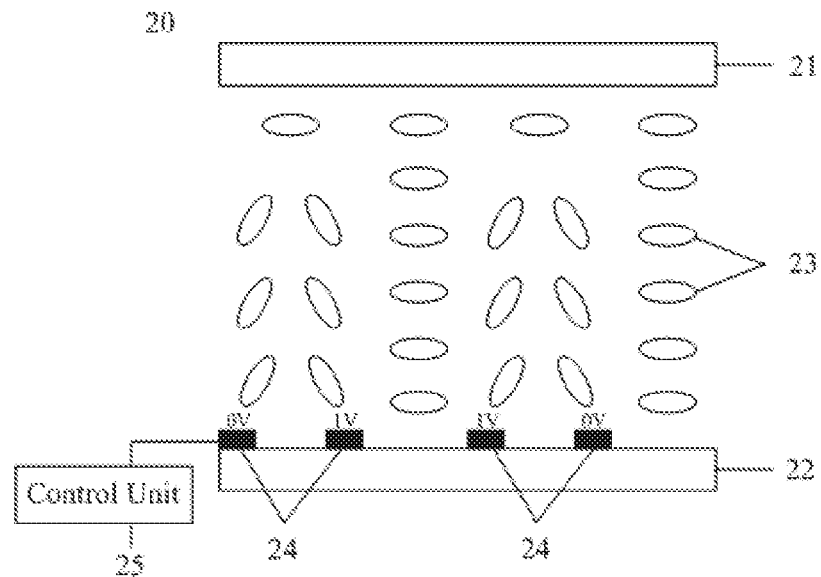
Figure 2C:
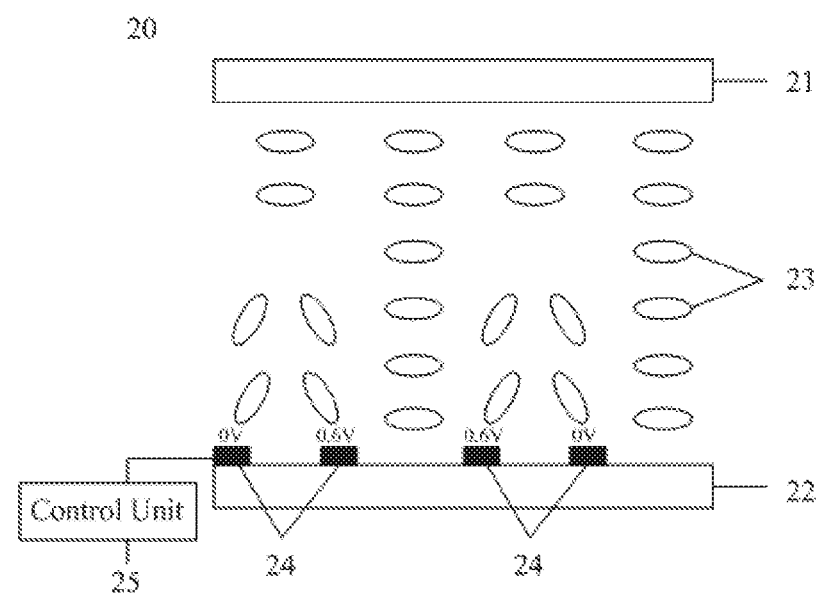

FIGS. 2A, 2B and 2C schematically illustrate cross-sectional views of an exemplary liquid crystal grating 20 according to an embodiment of the present disclosure. As illustrated in FIGS. 2A, 2B and 2C, the liquid crystal grating 20 comprises a first substrate 21; a second substrate 22 disposed opposite to the first substrate 21; an electrode layer disposed on the second substrate 22, wherein the electrode layer comprises two sets of electrodes 24 arranged periodically, and each set of electrodes 24 comprises two sub-electrodes arranged parallel to each other; a liquid crystal layer 23 disposed between the first substrate 21 and the second substrate 22; and a control unit 25 coupled to the electrode layer. The control unit 25 controls voltages on the sub-electrodes of each set of electrodes 24, so that the liquid crystal grating 20 is operated in a transparent mode or a grating mode.

In one exemplary embodiment, the width of the sub-electrode may be in a range of about 2 nm to 20 nm, and optionally about 5 nm. The width between the two sub-electrodes of each set of electrodes 24 may be in a range of about 20 nm to 100 nm, and optionally about 50 nm. The width between two adjacent sub-electrodes of different sets may be in a range of about 100 nm to 200 nm, and optionally about 150 nm. The distance from a lower surface of the first substrate 21 to an upper surface of the second substrate 22 may be in a range of about 1 μm to 4 μm, and optionally about 2 μm.

In one exemplary embodiment, as illustrated in FIG. 2A, the control unit 25 adjusts the voltages on the two sub-electrodes of each set of electrodes 24, so that the voltages on the two sub-electrodes of each set of electrodes 24 both are, for example, 0V. Since there is no voltage difference between the sub-electrodes, the liquid crystal molecules in the liquid crystal layer 23 do not rotate. In that case, the liquid crystal grating 20 is operated in the transparent mode. Since no diffraction effect occurs, the light path of the incident light substantially does not change.

It should be understood that the control unit 25 may also adjust the voltages on the two sub-electrodes of each set of electrodes 24 to be, for example, 1V or 10V, or any other voltage values which ensure that there is no voltage difference between the two sub-electrodes of each set of electrodes 24 such that the liquid crystal grating 20 to be operated in the transparent mode.

In another exemplary embodiment, as illustrated in FIG. 2B, the control unit 25 adjusts the voltages on the two sub-electrodes of each set of electrodes 24, so that the voltages on two sub-electrodes of each set of electrodes 24 are, for example, 0V and 1V, respectively, and there is no voltage difference between two adjacent sub-electrodes of different sets. Since the voltage difference between the two sub-electrodes of each set of electrodes 24 is 1V, the liquid crystal molecules in corresponding areas above the two sub-electrodes of each set of electrodes 24 are rotated under the effect of the electric field, so as to form a pattern area of the liquid crystal grating 20, which herein refers to an area where liquid crystal molecules in the liquid crystal layer 23 rotate under the effect of the electric field. Since the voltage difference between two adjacent sub-electrodes of different sets is 0V, the liquid crystal molecules in corresponding area above those two adjacent sub-electrodes of different sets do not rotate, so as to form a non-pattern area of the liquid crystal grating 20. It is understood that in the embodiment of the present disclosure, the pattern area and the non-pattern area may result in a light path difference, which causes a diffraction phenomenon. At that time, the liquid crystal grating 20 is operated in the grating mode. Since the electrodes 24 are periodically arranged, the liquid crystal molecules are periodically rearranged, so as to form a grating structure. In this embodiment, the voltage difference between the two sub-electrodes of each set of electrodes 24 is 1V, which makes a thickness of the pattern area be equal to, for example, a wavelength 650 nm of red light. In the embodiments of the present disclosure, the thickness of the pattern area refers to an extension range of the pattern area in a direction perpendicular to the first substrate 21 or the second substrate 22. It can be understood that the specific value of the voltage difference depends on various factors, such as the used liquid crystal material and the like. Thus, the values of the voltage differences listed in the embodiments of the present disclosure are merely for the purpose of explaining, rather than limiting the embodiments of the present disclosure. According to one embodiment of the present disclosure, the voltage difference between two sub-electrodes may not vary with time, so that the thickness of the pattern area does not vary with time.

In one exemplary embodiment, the voltage difference between the two sub-electrodes of each set of electrodes may be same, so that the thickness of the pattern area between the two sub-electrodes is same.

In another exemplary embodiment, as illustrated in FIG. 2C, the control unit 25 adjusts the voltages on the two sub-electrodes of each set of electrodes 24, so that the voltages on the two sub-electrodes of each set of electrodes 24 are, for example, 0V and 0.6V, respectively, and there is no voltage difference between two adjacent sub-electrodes of different sets. In comparison with the embodiment as illustrated in FIG. 2B, the voltage difference between the two sub-electrodes decreases, and the voltage difference reduces the thickness of the pattern area, the thickness is for example equal to a wavelength 550 nm of green light.

According to one embodiment of the present disclosure, the voltage difference between two sub-electrodes may not vary with time, so that the thickness of the pattern area does not vary with time.

In one exemplary embodiment, the control unit 25 may also adjusted the voltage difference between the two sub-electrodes of each set of electrodes 24, so that the voltage difference varies within a predetermined range at a predetermined frequency such as 180 Hz, thereby dynamically adjusting the thickness of the pattern area.

It should be understood that the electrode layer may also be disposed on the first substrate 21. The number of the electrodes 24 in the electrode layer is not limited to two and may be plural. The diffraction effect of the liquid crystal grating is better as the number of the electrodes increases.

It should be noted that the materials of the first substrate 21 and the second substrate 22 may include glass or any other transparent material. The sub-electrodes of each set of electrodes 24 may be all made of transparent conductive materials, and the transparent conductive materials may be selected from at least one of zinc oxide, indium tin oxide, indium zinc oxide, indium tin zinc oxide, aluminum tin oxide, aluminum zinc oxide, cadmium indium oxide, cadmium zinc oxide, gallium zinc oxide, or tin oxyfluoride.

As mentioned above, the control unit adjusts the voltage difference between the sub-electrodes of each set of electrodes, such that the liquid crystal grating can be switched between the transparent mode and the grating mode. The thickness of the pattern area can be adjusted dynamically by adjusting the magnitude of the voltage difference at a predetermined frequency. If the liquid crystal grating is applied to the display device, different thicknesses of the pattern area can correspond to the light of different wavelengths, so as to eliminate the zero-order diffraction of the light of different wavelengths, thereby distributing the energy within a large range of viewing angle.

FIG. 1 schematically illustrates a diffraction pattern of light. The diffraction formula d*sin i+(n−1)*h±d*sin θ=(2m+1)*λ/2 will now be described with reference to FIG. 1, wherein d is a grating constant; i is an incident angle of incident light; θ is an exit angle of exit light; n is a refractive index of a grating material; h is a grating thickness; m is an integer; and λ is a wavelength of incident light. When n=1.5, m=0 and h=λ, sin i=sin θ. In that case, the incident angle of the incident light and the exit angle of the exit light are the same. As the light path difference is odd times of the half wavelength, the phase is canceled. In other words, the zero-order diffraction is cancelled, the ±1-order diffraction is enhanced, and the exit angle of the exit light is increased.

Figure 3A:
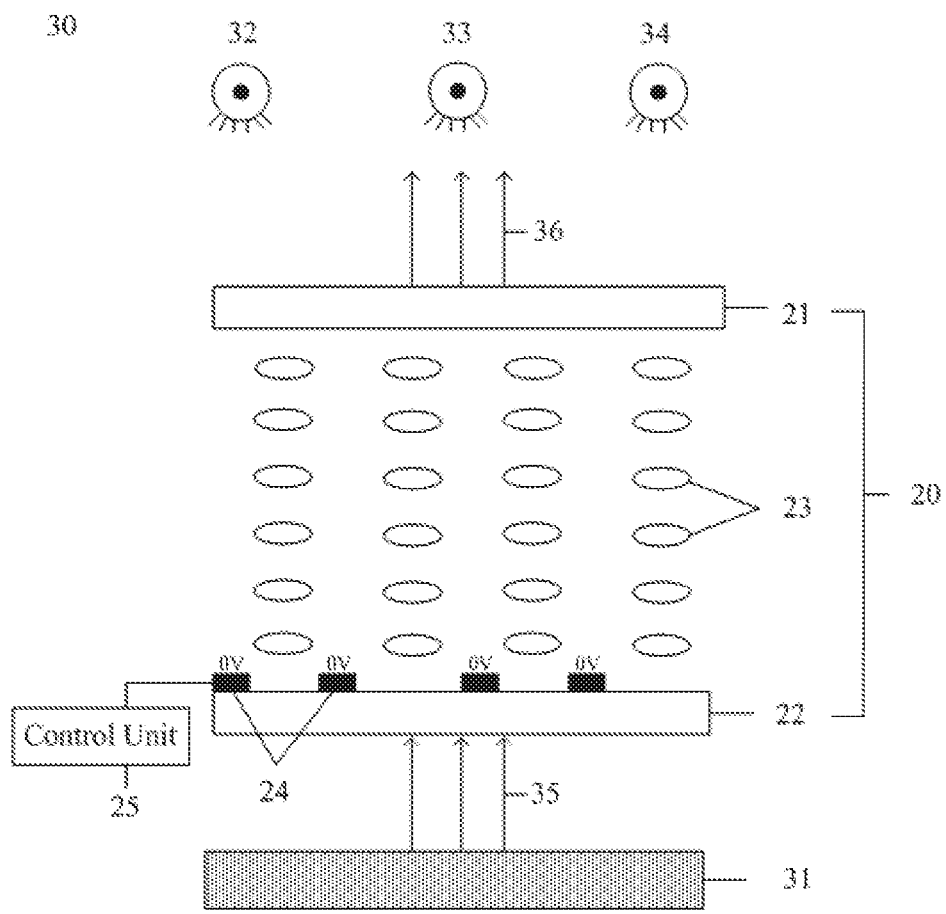
FIGS. 3A, 3B and 3C schematically illustrate cross-sectional views of an exemplary display device according to an embodiment of the present disclosure.
Figure 3B:
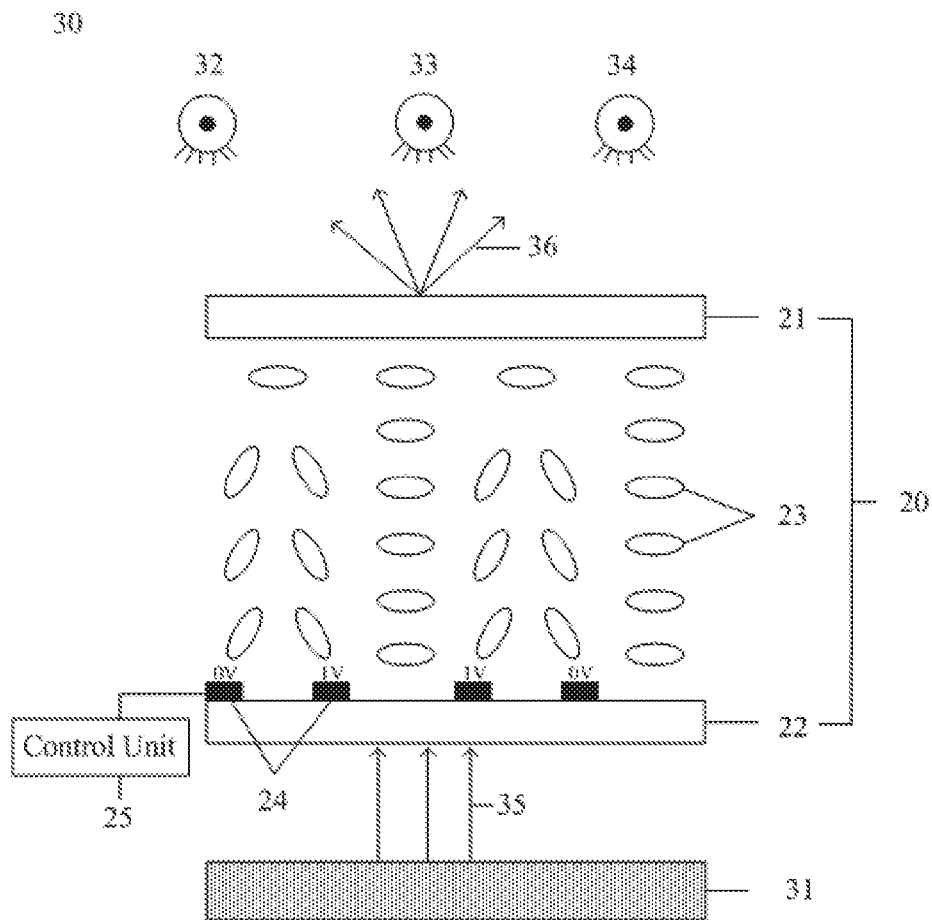
Figure 3C:
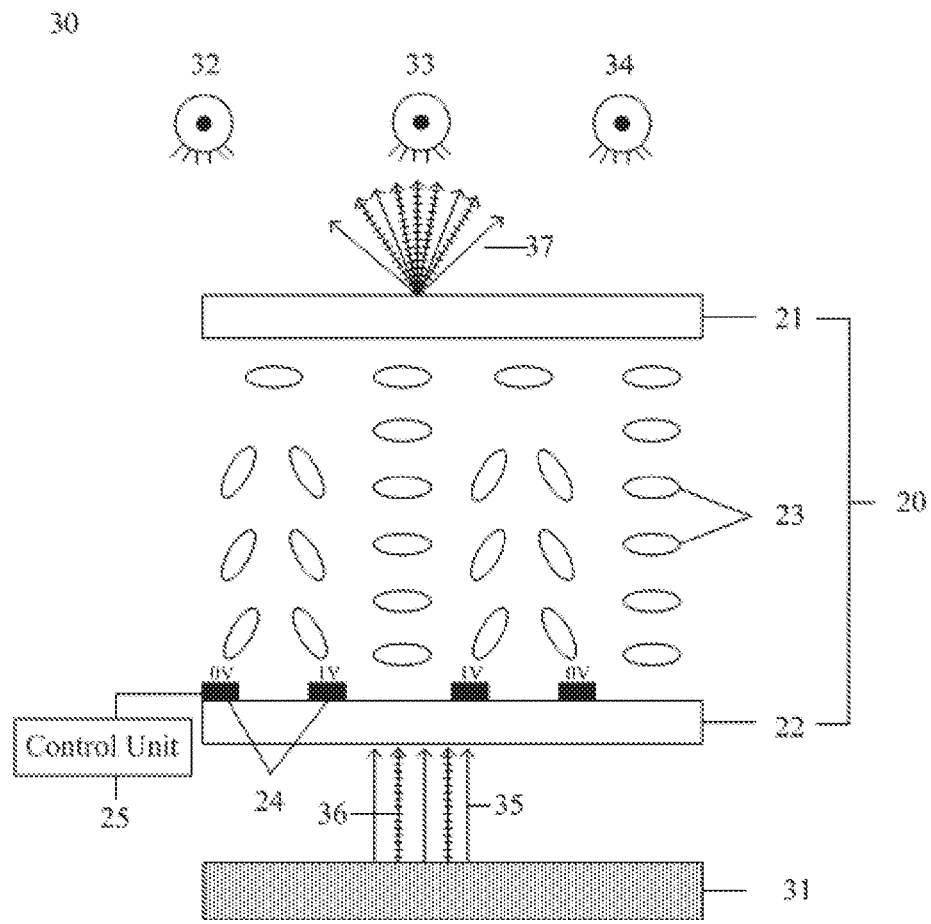

FIGS. 3A, 3B and 3C schematically illustrate cross-sectional views of an exemplary display device 30 according to an embodiment of the present disclosure. In one exemplary embodiment, as illustrated in FIGS. 3A, 3B and 3C, the display device 30 may comprise a display module 31, and a liquid crystal grating 20 according to the embodiment of the present disclosure located above an upper polarizer of the display module 31. According to the embodiment of present disclosure, the display module 31 may be a liquid crystal display module.

In one exemplary embodiment, as illustrated in FIG. 3A, the control unit 25 adjusts the voltages on the two sub-electrodes of each set of electrodes 24, so that the voltages on the two sub-electrodes of each set of electrodes 24 are both, for example, 0V. With the same structure and function of the liquid crystal grating as that illustrated in FIG. 2A, since there is no voltage difference between the sub-electrodes, the liquid crystal molecules in the liquid crystal layer 23 do not rotate and the liquid crystal grating 20 is operated in the transparent mode.

According to one embodiment of present disclosure, incident light 35 does not diffract after the incident light 35 having an incident angle of, for example, 0° from the display module 31 passing through the liquid crystal grating 20 operated in the transparent mode. The exit angle of exit light 36 is the same as the incident angle of the incident light 35, both being 0°. A human eye 33 can see the exit light 36 from the display module 31, but human eyes 32 and 34 deviated from the display device 30 cannot see the exit light 36 from the display module 31, i.e., the liquid crystal grating 20 can't increase the viewing angle of the display device. That is to say, if the display device 30 is operated in the anti-peeping mode at that time, it is still in the anti-peeping mode.

It should be understood that the incident light may be visible light with any wavelength, and the incident angle of the incident light is not limited to 0°, and any other angles are also possible. After the incident light passes through the liquid crystal grating operated in the transparent mode, the exit angle of the incident light does not change, or only changes slightly without causing a significant change of the viewing angle.

It can be understood that the control unit 25 may also adjust the voltages on the two sub-electrodes of each set of electrodes 24 to be both other values, such as 1V or 10V, as long as any voltage values can ensure that there is no voltage difference between the two sub-electrodes of each set of electrodes 24.

In another exemplary embodiment, as illustrated in FIG. 3B, the control unit 25 adjusts the voltages on the two sub-electrodes of each set of electrodes 24, so that the voltages on two sub-electrodes of each set of electrodes 24 are, for example, 0V and 1V, respectively, and there is no voltage difference between two adjacent sub-electrodes of different sets. With the same structure and function of the liquid crystal grating as that illustrated in FIG. 2B, the liquid crystal grating 20 is operated in the grating mode. In this embodiment, the voltage difference between the two sub-electrodes of each set of electrodes 24 is 1V, which makes a thickness of the pattern area be equal to, for example, a wavelength 650 nm of red light. According to one embodiment of the present disclosure, when the incident light 35 from the display module 31 is red light and the incident angle is 0°, the incident light 35 is diffracted after passing through the liquid crystal grating 20 operated in the grating mode, because the width between adjacent two sub-electrodes of different sets is very small and less than the wavelength of the incident light 35. According to the diffraction formula of the grating, the zero-order diffraction of the incident light 35 is canceled and the ±1-order diffraction is enhanced. The human eyes 32, 33 and 34 can all see exit light 36 from the display module 31. As compared to the display device illustrated in FIG. 3A, when being operated in the grating mode, the liquid crystal grating 20 can increase the exit angle of the exit light 36, so that the human eyes 32 and 34 deviated from the display device 30 can see the exit light 36. That is to say, if the display device 30 is operated in the anti-peeping mode at that time, it is switched to the sharing mode. In this embodiment, the voltage difference between the two sub-electrodes may not vary with time, so that the thickness of the pattern area does not vary with time.

In one exemplary embodiment, the voltage difference between the two sub-electrodes of each set of electrodes may be the same, so that the thickness of the pattern area between the two sub-electrodes is the same.

It should be understood that the incident light may be visible light with any wavelengths, and the incident angle of the incident light is not limited to 0°, and any other angles is also possible.

As described above, the control unit adjusts the voltages on the sub-electrodes, so that the thickness of the pattern area is equal to the wavelength of the incident light. After the incident light passes through the liquid crystal grating operated in the grating mode, the zero-order diffraction of the incident light is cancelled, and the ±1-order diffraction is enhanced, which increases the exit angle of the exit light, thereby increasing the viewing angle of the display device, so that the display device is switched from the anti-peeping mode to the sharing mode.

In another exemplary embodiment, as illustrated in FIG. 3C, the control unit 25 adjusts the voltages on the two sub-electrodes of each set of electrodes 24, so that the voltages on two sub-electrodes of each set of electrodes 24 are, for example, 0V and 1V, respectively, and there is no voltage difference between two adjacent sub-electrodes of different sets. With the same structure and function of the liquid crystal grating as that illustrated in FIG. 2B, the liquid crystal grating 20 is operated in the grating mode at that time. In this embodiment, the voltage difference between the two sub-electrodes of each set of electrodes 24 is 1V, which makes the thickness of the pattern area be equal to, for example, a wavelength 650 nm of red light. According to one embodiment of the present disclosure, when the incident light from the display module 31 contains red light 35 and green light 36 with incident angles thereof being both 0°, the red light 35 and the green light 36 of the incident light is both diffracted after the incident light passing through the liquid crystal grating 20 operated in the grating mode, because the width between adjacent two sub-electrodes of different sets is very small and less than the wavelength of the incident light. According to the diffraction formula of the grating, since the thickness of the pattern area is equal to the wavelength of the red light, the zero-order diffraction of the red light 35 is cancelled, the ±1-order diffraction thereof is enhanced, and the zero-order diffraction of the green light 36 is not completely canceled. This allows the human eye 33 to see the green light with a high light intensity, and the human eyes 32 and 34 to see the red light of a high light intensity. As compared to the display device illustrated in FIG. 3A, if the liquid crystal grating 20 is operated in the grating mode, the liquid crystal grating 20 can increase the exit angle of the incident light even if the incident light is two-color light, so that the human eyes 32 and 34 deviated from the display device 30 can see the exit light 37. That is to say, if the display device 30 is operated in the anti-peeping mode at that time, it is switched to the sharing mode. In this embodiment, the voltage difference between the two sub-electrodes may not vary with time so that the thickness of the pattern area does not vary with time.

It should be understood that the incident light is not limited to two-color light, and it may be three-color light or polychromatic light. The incident angle of the incident light is not limited to 0°, and any other angles are also possible. The control unit adjusts the voltage difference between the sub-electrodes, so that a thickness of the pattern area is equal to a wavelength of incident light of a certain color. In addition, since the voltages on the two sub-electrodes do not vary with time, the liquid crystal grating only cancel the zero-order diffraction of light of that color, while cannot completely cancel the zero-order diffraction of light of any other colors.

Figure 4A:
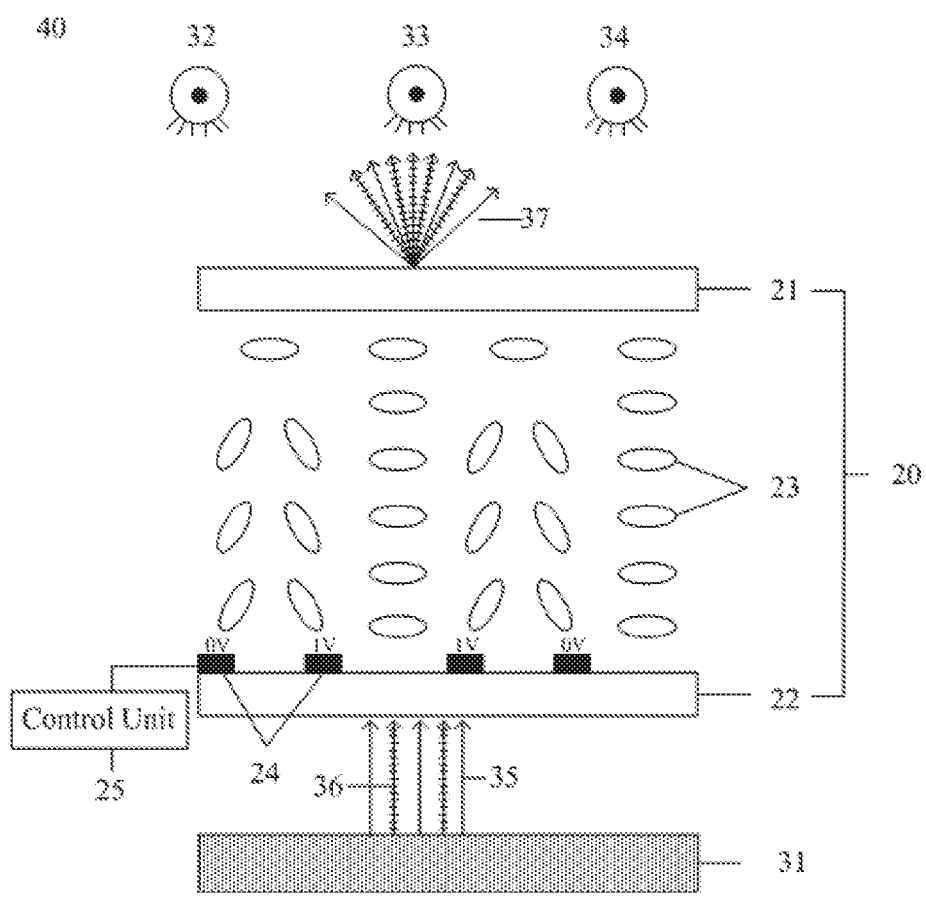
FIGS. 4A and 4B schematically illustrate cross-sectional views of an exemplary display device according to another embodiment of the present disclosure.
Figure 4B:
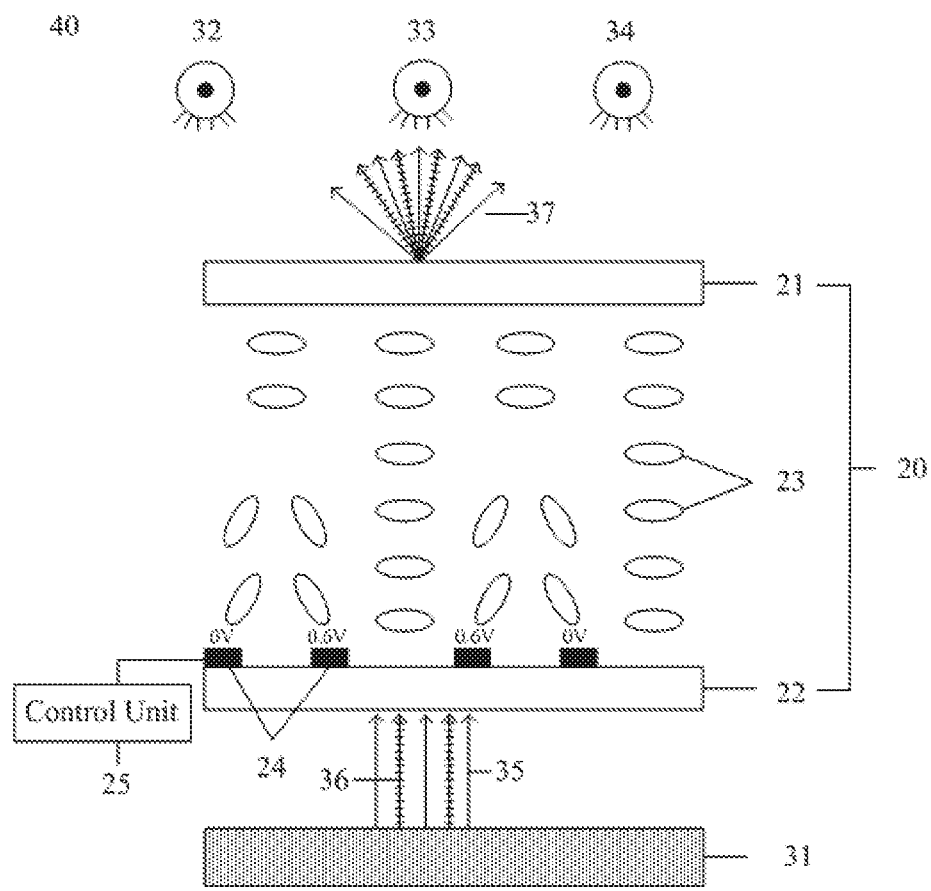

FIGS. 4A and 4B schematically illustrate cross-sectional views of an exemplary display device 40 according to another embodiment of the present disclosure. The structure and the function of the display device are similar to those of the display device illustrated in FIG. 3C, and not repeated herein. In one exemplary embodiment, the control unit 25 adjusts the voltage difference between the two sub-electrodes of each set of electrodes 24, so that the voltage difference varies for example at 0.6V and 1V, at a predetermined frequency such as three times (180 Hz) of a refresh frequency of the display device, so as to dynamically adjust the thickness of the pattern area. In addition, there is no voltage difference between two adjacent sub-electrodes of different sets. According to one embodiment of the present disclosure, at a certain time, as illustrated in FIG. 4A, the control unit 25 adjusts the voltages on the two sub-electrodes of each set of electrodes 24, so that the voltages on two sub-electrodes of each set of electrodes 24 are, for example, 0V and 1V, respectively, and there is no voltage difference between two adjacent sub-electrodes of different sets. The function are similar to those of the display device illustrated in FIG. 3C, the zero-order diffraction of the red light 35 of the incident light is cancelled, the ±1-order diffraction thereof is enhanced, and the zero-order diffraction of the green light 36 of the incident light is not completely canceled. This allows the human eye 33 to see the green light of a high light intensity, and the human eyes 32 and 34 to see the red light of a high light intensity. After 0.0056 s, as illustrated in FIG. 4B, the control unit 25 adjusts the voltages on the two sub-electrodes of each set of electrodes 24, so that the voltages on two sub-electrodes of each set of electrodes 24 are, for example, 0V and 0.6V, respectively, and there is no voltage difference between two adjacent sub-electrodes of different sets. According to one embodiment of the present disclosure, since the thickness of the pattern area is equal to, for example, the wavelength of the green light 36, the zero-order diffraction of the green light 36 of the incident light is cancelled, the ±1-order diffraction thereof is enhanced, and the zero-order diffraction of the red light 35 of the incident light is not completely cancelled. This allows the human eye 33 to see the red light of a high light intensity, and the human eyes 32 and 34 to see the green light of a high light intensity. In addition, due to the visual persistence, the human eyes 32, 33 and 34 can simultaneously see the red and green light of high light intensities within a certain period of time, thereby eliminating the problem of chromatic aberration when viewing the display device 40 in different positions.

It should be understood that the incident light is not limited to two-color light, and it may be three-color light or polychromatic light. The incident angle of the incident light is not limited to 0°, and any other angles are also possible. If incident light is three-color light, the voltage difference between the sub-electrodes varies at a predetermined frequency such as three times (180 Hz) of a refresh frequency of the display device, so that the human eyes can feel better color effects at different positions.

It should be understood that the display module comprises, but not limited to, a liquid crystal display module, and it may also be an OLED display module. If the display module has a anti-peeping film, the liquid crystal grating can increase the viewing angle of the display device and switch the display device from the anti-peeping mode to the sharing mode. Regarding the liquid crystal display module, according to the exemplary embodiment of the present disclosure, the liquid crystal grating may also be located between a lower polarizer and a backlight module. Since the backlight module is limited by small-angle light, the liquid crystal grating can increase the angle of the exit light of the backlight module.

According to another embodiment of the present disclosure, there is also provided a method for controlling the aforementioned liquid crystal grating, which causes the liquid crystal grating to be switched between the transparent mode and the grating mode by adjusting the voltages on the electrodes.

Figure 5A:
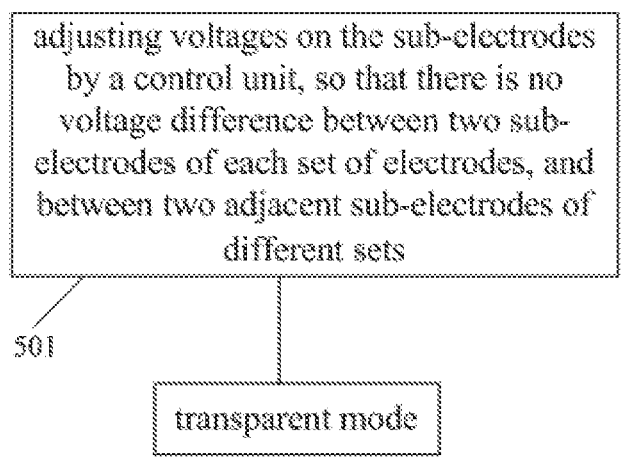
FIGS. 5A and 5B schematically illustrate flow diagrams of a method for controlling a liquid crystal grating.
Figure 5B:
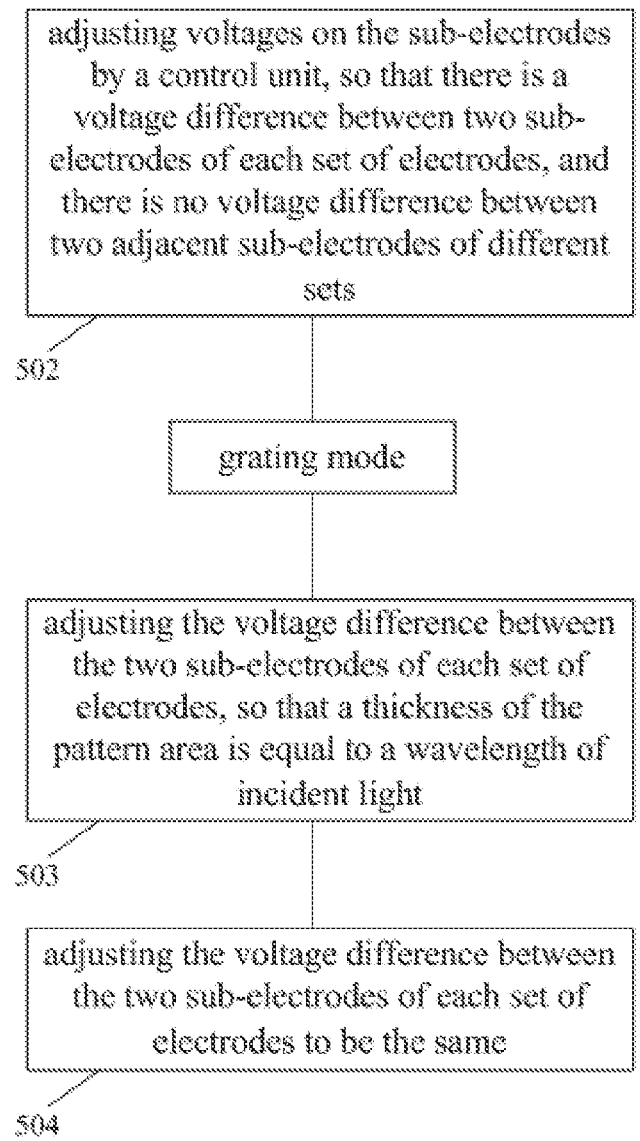

FIGS. 5A and 5B schematically illustrate flow diagrams of a method for controlling a liquid crystal grating.

In one exemplary embodiment, as illustrated in FIG. 5A, the method for controlling the liquid crystal grating may comprise: S501: adjusting voltages on the sub-electrodes by a control unit, so that there is no voltage difference between two sub-electrodes of each set of electrodes, and between two adjacent sub-electrodes of different sets, thereby causing the liquid crystal grating to be operated in a transparent mode. The method provided by this embodiment is applied to the liquid crystal grating illustrated in FIG. 2A and described in the aforementioned embodiment, and its structure, functions and/or advantages are the same as those of the liquid crystal grating in the aforementioned embodiment, which are omitted herein.

In another exemplary embodiment, as shown in FIG. 5B, the method for controlling the liquid crystal grating may comprise the steps of: S502: adjusting voltages on the sub-electrodes by a control unit, so that there is a voltage difference between two sub-electrodes of each set of electrodes, and there is no voltage difference between two adjacent sub-electrodes of different sets, thus a pattern area is formed only in a portion of the liquid crystal layer corresponding to each set of electrodes, thereby causing the liquid crystal grating to be operated in a grating mode; S503: adjusting the voltage difference between the two sub-electrodes of each set of electrodes, so that a thickness of the pattern area is equal to a wavelength of incident light; S504: adjusting the voltage difference between the two sub-electrodes of each set of electrodes to be the same, so that the thickness of the pattern area between the two sub-electrodes is the same. In a specific embodiment, the voltages on the two sub-electrodes of each set of electrodes may be adjusted by the control unit, so that the voltages on the two sub-electrodes of each set of electrodes are, for example, 0V and 1V, respectively, and the voltage difference makes the thickness of the pattern area be equal to, for example, a wavelength 650 nm of red light. The method provided by this embodiment is applied to the liquid crystal grating illustrated in FIG. 2B and described in the aforementioned embodiment, and its structure, functions and/or advantages are the same as those of the liquid crystal grating in the aforementioned embodiment, which are omitted herein.

According to one embodiment of the present disclosure, the method for controlling the liquid crystal grating further comprises: adjusting the voltage difference between the two sub-electrodes of each set of electrodes by the control unit, so that the voltage difference varies at a predetermined frequency, so as to dynamically adjust the thickness of the pattern area. When the liquid crystal grating is applied to the display device, different thicknesses of the pattern area may correspond to the light of different wavelengths, so as to cancel the zero-order diffraction of the light of different wavelengths, thereby distributing the energy within a large range of viewing angle.

According to another embodiment of the present disclosure, a method for controlling the aforementioned display device is also provided. By adjusting the voltages on the electrodes, the liquid crystal grating is switched between the transparent mode and the grating mode. The liquid crystal grating is applied to the display device, and the viewing angle of the display device can be increased when the liquid crystal grating is operated in the grating mode. By adjusting the magnitude of the voltage difference between the electrodes, the zero-order diffraction of the light of different wavelengths can be canceled, and the energy can be distributed within large range of viewing angle, i.e., the liquid crystal grating can increase the viewing angle of the display device. That is to say, if the display device is operated in the anti-peeping mode at that time, it is switched to the sharing mode.

In one exemplary embodiment, the method for controlling the display device may comprise: adjusting voltages on the sub-electrodes by a control unit, so that there is no voltage difference between the two sub-electrodes of each set of electrodes, and between adjacent two sub-electrodes of different sets, thereby causing the liquid crystal grating to be operated in the transparent mode. The method provided by this embodiment is applied to the display device illustrated in FIG. 3A and described in the aforementioned embodiment, and its structure, functions and/or advantages are the same as those of the display device in the aforementioned embodiment, which are omitted herein.

In another exemplary embodiment, the method for controlling the display device may comprise the steps of: adjusting voltages on the sub-electrodes by a control unit, so that there is a voltage difference between the two sub-electrodes of each set of electrodes, and there is no voltage difference between adjacent two sub-electrodes of different sets, thus a pattern area is formed only in a portion of the liquid crystal layer corresponding to each set of electrodes, thereby causing the liquid crystal grating to be operated in a grating mode; adjusting the voltage difference between the sub-electrodes of each set of electrodes, so that a thickness of the pattern area is equal to a wavelength of incident light of a certain color; adjusting the voltage difference between the two sub-electrodes of each set of electrodes to be the same, so that the thickness of the pattern area between the two sub-electrodes is the same. In a specific embodiment, the voltages on the two sub-electrodes of each set of electrodes may be adjusted by the control unit, so that the voltages on the two sub-electrodes of each set of electrodes are, for example, 0V and 1V, respectively, and the voltage difference makes the thickness of the pattern area be equal to, for example, a wavelength 650 nm of red light. The method provided by this embodiment is applied to the display device illustrated in FIG. 3B and described in the aforementioned embodiment, and its structure, functions and/or advantages are the same as those of the display device in the aforementioned embodiment, which are omitted herein.

According to one embodiment of the present disclosure, the method for controlling the display device further comprises: adjusting the voltage difference between the two sub-electrodes of each set of electrodes by the control unit, so that the voltage difference varies at a predetermined frequency, so as to dynamically adjust the thickness of the pattern area. In a specific embodiment, the voltage difference between the two sub-electrodes of each set of electrodes is adjusted by the control unit, so that the voltage difference varies for example at 0.6V and 1V, at a predetermined frequency such as three times (180 Hz) of a refresh frequency of the display device. The method provided by this embodiment is applied to the display device illustrated in FIG. 4 and described in the aforementioned embodiment, and its structure, functions and/or advantages are the same as those of the display device in the aforementioned embodiment, which are omitted herein.

The flow diagram described in the present disclosure is just one example. There may be many modifications to the flow diagram or the steps described therein without departing from the spirit of the present disclosure. For example, the steps may be performed in a different order, or the steps may be added, deleted, or amended.

The control unit described herein may be implemented as a combination of a processor and a memory, wherein the processor executes a program stored in the memory to realize the function of corresponding control unit. The control unit described herein can also be implemented with complete hardware, including an Application-Specific Integrated Circuit (ASIC), a Field-Programmable Gate Array (FPGA), and so on.

The foregoing descriptions of the embodiments have been provided for the purposes of illustration and description. It is not intended to be exhaustive or to limit the application. Individual elements or features of a particular embodiment are generally not limited to that particular embodiment, but where appropriate, these elements and features are interchangeable and can be used in a selected embodiment, even if not specifically illustrated or described. The same may also be varied in many ways. Such a variation should not be considered as a departure from the application, and all those modifications are included within the scope of the application.

What is claimed is:

1. A display device, comprising a display module and a liquid crystal grating, the liquid crystal grating comprising:
   a first substrate;
   a second substrate disposed opposite to the first substrate;
   an electrode layer disposed on the first substrate or the second substrate, wherein the electrode layer comprises at least two sets of electrodes arranged periodically, and each set of electrodes of the two sets of electrodes comprises two sub-electrodes arranged parallel to each other;
   a liquid crystal layer disposed between the first substrate and the second substrate; and
   a control unit configured to operate the liquid crystal grating in a transparent mode or a grating mode, wherein:
   when the liquid crystal grating is operated in the transparent mode, there is no voltage difference between the two sub-electrodes of each set of electrodes, and there is no voltage difference between two adjacent sub-electrodes of different sets; and
   when the liquid crystal grating is operated in the grating mode, there is a voltage difference between the two sub-electrodes of each set of electrodes, and there is no voltage difference between two directly adjacent sub-electrodes of different sets.

2. The display device according to claim 1, wherein when the liquid crystal grating is operated in the grating mode, the voltage difference between the two sub-electrodes of each set of electrodes is the same.

3. The display device according to claim 2, wherein when the liquid crystal grating is operated in the grating mode, the voltage difference between the two sub-electrodes of each set of electrodes varies at a predetermined frequency.

4. The display device according to claim 2, wherein when the liquid crystal grating is operated in the grating mode, the voltage difference between the two sub-electrodes of each set of electrodes makes an extension range of an area, where liquid crystal molecules in the liquid crystal layer are rotated, in a direction perpendicular to the first substrate or the second substrate, equal to a wavelength of incident light.

5. The display device according to claim 1, wherein the display module is a liquid crystal display module, and the liquid crystal grating is located above an upper polarizer of the liquid crystal display module or between a lower polarizer and a backlight module thereof.

6. A method for controlling the display device according to claim 5, the method comprising:
operating, by the control unit, the liquid crystal grating be operated in a transparent mode or a grating mode,
when the liquid crystal grating is operated in the transparent mode, operating includes operating the liquid crystal grating with no voltage difference between the two sub-electrodes of each set of electrodes, and with no voltage difference between two adjacent sub-electrodes of different sets; and
when the liquid crystal grating is operated in the grating mode, operating includes operating the liquid crystal grating with a voltage difference between the two sub-electrodes of each set of electrodes, and with no voltage difference between two adjacent sub-electrodes of different sets.

7. A method for controlling a display device, the display device comprising a display module and a liquid crystal grating, the liquid crystal grating comprising:
a first substrate;
a second substrate disposed opposite to the first substrate;
an electrode layer disposed on the first substrate or the second substrate, wherein the electrode layer comprises at least two sets of electrodes arranged periodically, and each set of electrodes of the two sets of electrodes comprises two sub-electrodes arranged parallel to each other;
a liquid crystal layer disposed between the first substrate and the second substrate; and
a control unit configured to operate the liquid crystal grating in a transparent mode or a grating mode, the method comprising:
operating, by the control unit, the liquid crystal grating in the transparent mode or the grating mode, wherein:
when the liquid crystal grating is operated in the transparent mode, operating includes operating the liquid crystal grating with no voltage difference between the two sub-electrodes of each set of electrodes, and between two adjacent sub-electrodes of different sets; and
when the liquid crystal grating is operated in the grating mode, operating includes operating the liquid crystal grating with a voltage difference between the two sub-electrodes of each set of electrodes, and with no voltage difference between two directly adjacent sub-electrodes of different sets.

8. The method according to claim 7, wherein when the liquid crystal grating is operated in the grating mode, the voltage difference between the two sub-electrodes of each set of electrodes is the same.

9. The method according to claim 8, wherein when the liquid crystal grating is operated in the grating mode, the voltage difference between the two sub-electrodes of each set of electrodes varies at a predetermined frequency.

10. The method according to claim 9, wherein the predetermined frequency is more than three times of a refresh frequency of the display device.

11. A method for controlling a display module and a liquid crystal grating, the liquid crystal grating comprising:
a first substrate;
a second substrate disposed opposite to the first substrate;
an electrode layer disposed on the first substrate or the second substrate, wherein the electrode layer comprises at least two sets of electrodes arranged periodically, and each set of electrodes of the two sets of electrodes comprises two sub-electrodes arranged parallel to each other;
a liquid crystal layer disposed between the first substrate and the second substrate; and
a control unit configured to operate the liquid crystal grating in a transparent mode or a grating mode, the method comprising:
operating, by the control unit, the liquid crystal grating in the transparent mode or the grating mode, wherein:
when the liquid crystal grating is operated in the transparent mode, operating includes operating the liquid crystal grating with no voltage difference between the two sub-electrodes of each set of electrodes, and between two adjacent sub-electrodes of different sets; and
when the liquid crystal grating is operated in the grating mode, operating includes operating the liquid crystal grating with a voltage difference between the two sub-electrodes of each set of electrodes, and with no voltage difference between two directly adjacent sub-electrodes of different sets, and the voltage difference between the two sub-electrodes of each set of electrodes makes an extension range of an area, where liquid crystal molecules in the liquid crystal layer are rotated, in a direction perpendicular to the first substrate or the second substrate, equal to a wavelength of incident light.

* * * * *